(12) United States Patent
Schober

(10) Patent No.: US 9,298,477 B2
(45) Date of Patent: Mar. 29, 2016

(54) WIZARD NAVIGATION LIST

(75) Inventor: Yan Schober, San Francisco, CA (US)

(73) Assignee: AUTODESK, Inc., San Rafael, CA (US)

( * ) Notice: Subject to any disclaimer, the term of this patent is extended or adjusted under 35 U.S.C. 154(b) by 1921 days.

(21) Appl. No.: 11/945,347

(22) Filed: Nov. 27, 2007

(65) Prior Publication Data

US 2009/0138801 A1  May 28, 2009

(51) Int. Cl.
*G06F 3/14* (2006.01)
*G06F 9/44* (2006.01)

(52) U.S. Cl.
CPC .................................... *G06F 9/4446* (2013.01)

(58) Field of Classification Search
USPC .......................... 715/200–277; 700/701–866; 709/201–229; 705/50–70; 345/30–111, 345/738; 348/206–231.9; 707/3; 358/401
See application file for complete search history.

(56) References Cited

U.S. PATENT DOCUMENTS

| | | | |
|---|---|---|---|
| 6,094,684 A * | 7/2000 | Pallmann ....................... 709/227 |
| 2004/0233235 A1* | 11/2004 | Rubin et al. .................. 345/738 |
| 2005/0027702 A1* | 2/2005 | Jensen et al. ...................... 707/3 |
| 2005/0185225 A1* | 8/2005 | Brawn et al. .................. 358/401 |
| 2005/0198247 A1* | 9/2005 | Perry et al. .................... 709/223 |
| 2006/0236254 A1* | 10/2006 | Mateescu et al. ............. 715/762 |

\* cited by examiner

*Primary Examiner* — Ruay Ho
(74) *Attorney, Agent, or Firm* — Artegis Law Group, LLP

(57) ABSTRACT

Embodiments of the invention provide a navigation list allowing a user to quickly navigate to any desired panel of an application wizard. In one embodiment, the navigation list may be displayed with the application wizard. The navigation list may include links to each panel included in the application wizard. The user may select the link to a particular panel to navigate to that panel, without also having to pass through any intervening panels. Further, the navigation list may display names and settings for parameters included in each panel, thus allowing the user to quickly locate and evaluate each parameter setting included in the application wizard.

18 Claims, 5 Drawing Sheets

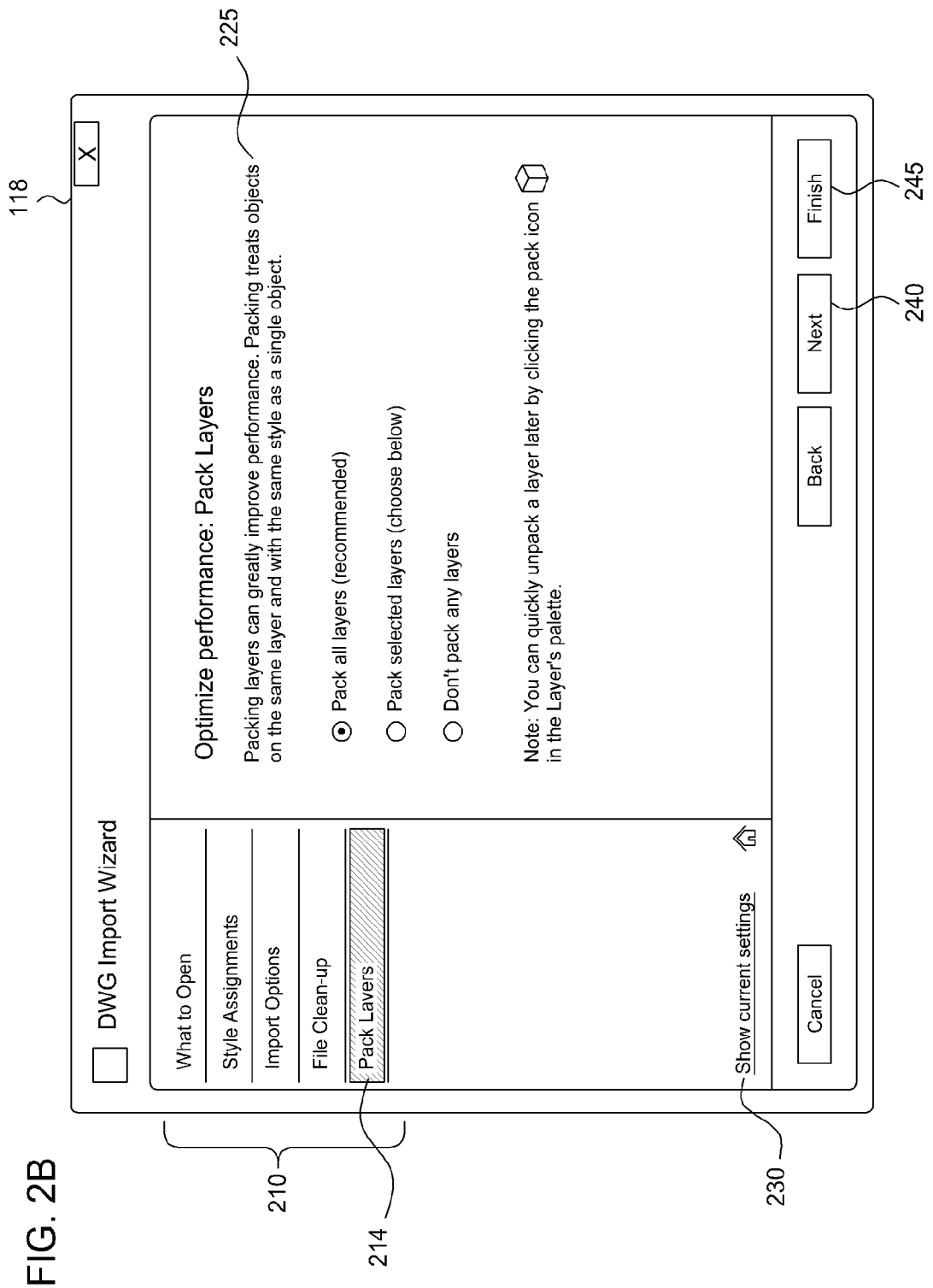

WIZARD NAVIGATION LIST

BACKGROUND OF THE INVENTION

1. Field of the Invention

The present invention generally relates to computer software. More specifically, the present invention relates to techniques allowing users to navigate through a software wizard.

2. Description of the Related Art

Generally, software applications provide functions which enable users to interact with the application. Many common software applications are used to compose and modify files which store graphics data (hereafter referred to as "drawings"). For example, a software application may be used to create a computer-aided design (CAD) drawing. Typically, a user of a software application selects specific functions, or commands, to compose the contents of the drawing.

Software applications such as these often include wizards, or user interface programs configured to guide a user through a sequence of steps to perform a given task. For example, wizards are frequently employed to guide inexperienced users in performing a complex task. Generally, a wizard presents the user with a series of dialog screens, each directed to performing a particular aspect of the task. The user navigates through the dialog screens in the sequence specified by the wizard and interacts with each dialog screen to specify parameter values required to perform the task represented by the wizard.

In some situations, the user of a software application may wish to interact with a particular dialog screen included in a wizard, without having to navigate through the entire wizard or wish to modify only a single parameter displayed in one screen. For example, an experienced user may be familiar with the use of a software application, and may wish to enter parameter values in order to perform a given task. However, conventional wizards require that this user interact with all dialog screens included in the wizard.

Accordingly, as the foregoing discussion demonstrates, there is a need in the art for improved techniques for navigating in a software wizard.

SUMMARY OF THE INVENTION

One embodiment of the invention includes a method of presenting a user with a navigable application wizard configured to assist a user in performing a particular task in a software application by guiding a user through a sequence of steps. The method may generally include presenting a navigation list that includes a plurality of links. Each link may be used to access a corresponding dialog screen associated with one of the steps of the application wizard and the navigation list may display parameter values settings associated with each step of the application wizard. The method generally also includes presenting a first dialog screen corresponding to a first step of the application wizard, receiving a selection of one of the links, and replacing the presentation of the first dialog screen with a second dialog screen corresponding to the selected link.

In a particular embodiment, the method of may also include receiving a selection to complete the wizard and performing the particular task associated with the software wizard using the parameter value settings. Further, if the user has modified any of the parameter settings, the settings used to execute the application wizard may be stored for use in subsequent invocations of the same application wizard.

Advantageously, therefore, the user may select the link to any particular dialog screen in order to navigate to that dialog screen, without having to pass through intervening dialog screens of the wizard. Further, the navigation list may display names and settings of parameters included in each dialog screen, allowing the user to quickly locate and evaluate a given parameter included in one of the panels of the wizard. Thus, the user may efficiently review each parameter value associated with each dialog screen of the wizard. Further still, the user may jump to any desired panel to modify parameters as needed and complete the wizard at any time to execute the task associated with the wizard.

BRIEF DESCRIPTION OF THE DRAWINGS

FIGS. 2A-2C illustrate a sequence of screen displays of a software wizard, including a wizard navigation list, according to one embodiment of the invention.

DETAILED DESCRIPTION OF THE PREFERRED EMBODIMENTS

As stated, in the context of a software application interface, the term "wizard" generally refers to a set of interface panels used to guide a user through the steps of a task. The user is guided through performing the task by being presented each sequential panel of the wizard. Each panel of the wizard focuses on a particular aspect of the task performed by the wizard. However, in some situations, the user may not desire or need to navigate through each panel to perform the task of the wizard. For example, the user may desire to set a single parameter included in the last panel of the wizard, but may be forced to navigate through each panel of the wizard before being able to do so.

Embodiments of the invention provide a navigation list allowing a user to quickly navigate to any desired panel of a software wizard. In one embodiment, the navigation list may be displayed with the wizard. The navigation list may include links to each panel included in the wizard. The user may select the link to a particular panel to navigate to that panel, without also having to pass through any intervening panels. Further, the navigation list may display names and settings for parameters included in each panel, thus allowing the user to quickly locate and evaluate each parameter setting included in the wizard. In the example where the user desires to set a single parameter included in the last panel of the wizard, the user may switch to a navigation list view of the wizard, jump to the final panel using the link presented in the navigation list, edit the desired setting, and complete the wizard to perform the desired task using the desired settings. Further, because the navigation list may present the settings for each other panel of the wizard, the user may also review these settings without the concomitant requirement of navigating through each panel individually.

Figure 1:
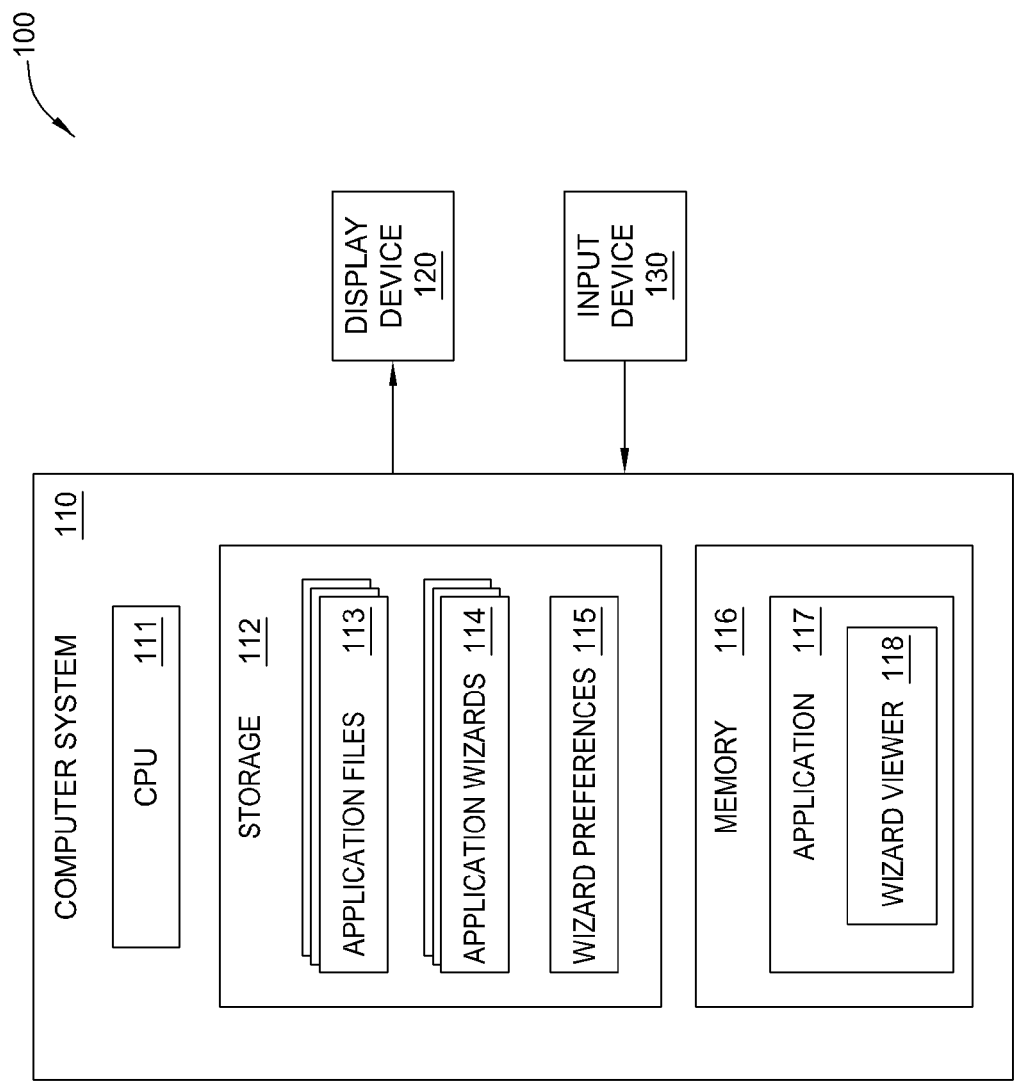
FIG. 1 is a block diagram illustrating a computer system configured to provide a wizard navigation list, according to one embodiment of the invention.

FIG. 1 is a block diagram 100 illustrating a computer system 110 configured to provide a wizard navigation list, according to one embodiment of the invention. The components illustrated in system 110 are included to be representative of computer software applications executing on existing computer systems, e.g., desktop computers, server computers, laptop computers, tablet computers, and the like. Of course, the software applications described herein are not limited to any particular computing system and may be adapted to take advantage of new computing systems as they become available.

Additionally, the components illustrated in system 110 may be implemented as software applications that execute on a single computer system or on distributed systems communicating over computer networks such as local area networks or large, wide area networks, such as the Internet. For example, system 110 at one physical location may include an application 117 that is controlled via a graphical user interface (GUI) executing on a client computer system at another physical location. Also, application 117 may be provided as an application program (or programs) stored on computer readable media such as a CD-ROM, DVD-ROM, flash memory module, or other tangible storage media.

As shown, system 110 includes, without limitation, a central processing unit (CPU) 111, storage 112, and memory 116. CPU 111 is a programmable logic device that performs all the instruction, logic, and mathematical processing in a computer. Storage 112 may represent hard-disk drives, flash memory devices, optical media and the like. Memory 126 could be one or a combination of memory devices, including random access memory, nonvolatile or backup memory, (e.g., programmable or Flash memories, read-only memories, etc. User input devices 130 typically include a mouse and a keyboard, and display devices 120 may include LCD or CRT displays.

Illustratively, memory 116 includes an application 117 and a wizard viewer 118, and storage 112 includes application files 113, application wizards 114, and wizard preferences 115. Application 117 represents a software application configured to compose and edit an application file 113. For example, application 117 may represent the AutoCAD® application program (and associated utilities) available from Autodesk, Inc., and application file 113 may represent an AutoCAD® drawing file.

Each application wizard 114 may include a predefined sequence of dialog screens or panels configured to guide the user through performing a particular task using the application 117. As shown, storage 112 may include multiple application wizards 114 used to assist a user in performing a variety of tasks. For example, application wizards 114 may be configured to convert an external file for use with the application 117, to configure a network connection, to install a new software application, to design a graphical style applied to elements of a CAD drawing, etc. Wizard viewer 118 represents a component of application 117 configured to display the panels included in one of the application wizards 114, enabling a user to perform the task associated with that wizard.

In one embodiment, wizard viewer 118 may be configured to selectively display a navigation list along with the panels of the application wizard 114. The navigation list may enable the user to navigate directly to any given panel of the wizard, without having to pass through any intervening panels. Further, the navigation list may display the current settings for parameters included in each panel of the wizard. An example of a navigation list is further discussed below with reference to FIGS. 2A-2C.

In one embodiment, wizard preferences 115 may store the user's preferences for displaying a navigation list associated with a given application wizard 114. That is, wizard preferences 115 may specify the user's preference for viewing one of the application wizards 114 in a standard mode (i.e., without a navigation list) or in an advanced mode (i.e., with a navigation list). Additionally, wizard preferences 115 may store values for certain parameters included in the application wizard 114. The values may be default values or may reflect values set during a previous invocation of a given wizard. For example, assume an application wizard 114 includes a parameter the user wishes to set once to apply to all future uses of that application wizard 114. In this situation, the parameter value specified by the user may be persistently stored in wizard preferences 115.

In one embodiment, wizard viewer 118 may be configured to show only those dialog screens or parameters that are applicable to a current application file 113. That is, in the situation of an application wizard 114 directed to a task for a particular application file 113, wizard viewer 118 may present only those dialog screens or parameters that are relevant to that application file 113. Thus, any dialog screens or parameters included in the application wizard 114 that are not applicable to the current application file 113 are not displayed to the user. For example, assume an application wizard 114 directed to importing a graphics file into a drawing application 117. In the situation that the graphics file does not include multiple layers, any dialog screens or parameters relating to multiple layers may not be presented in the wizard viewer 118.

Figure 2A:
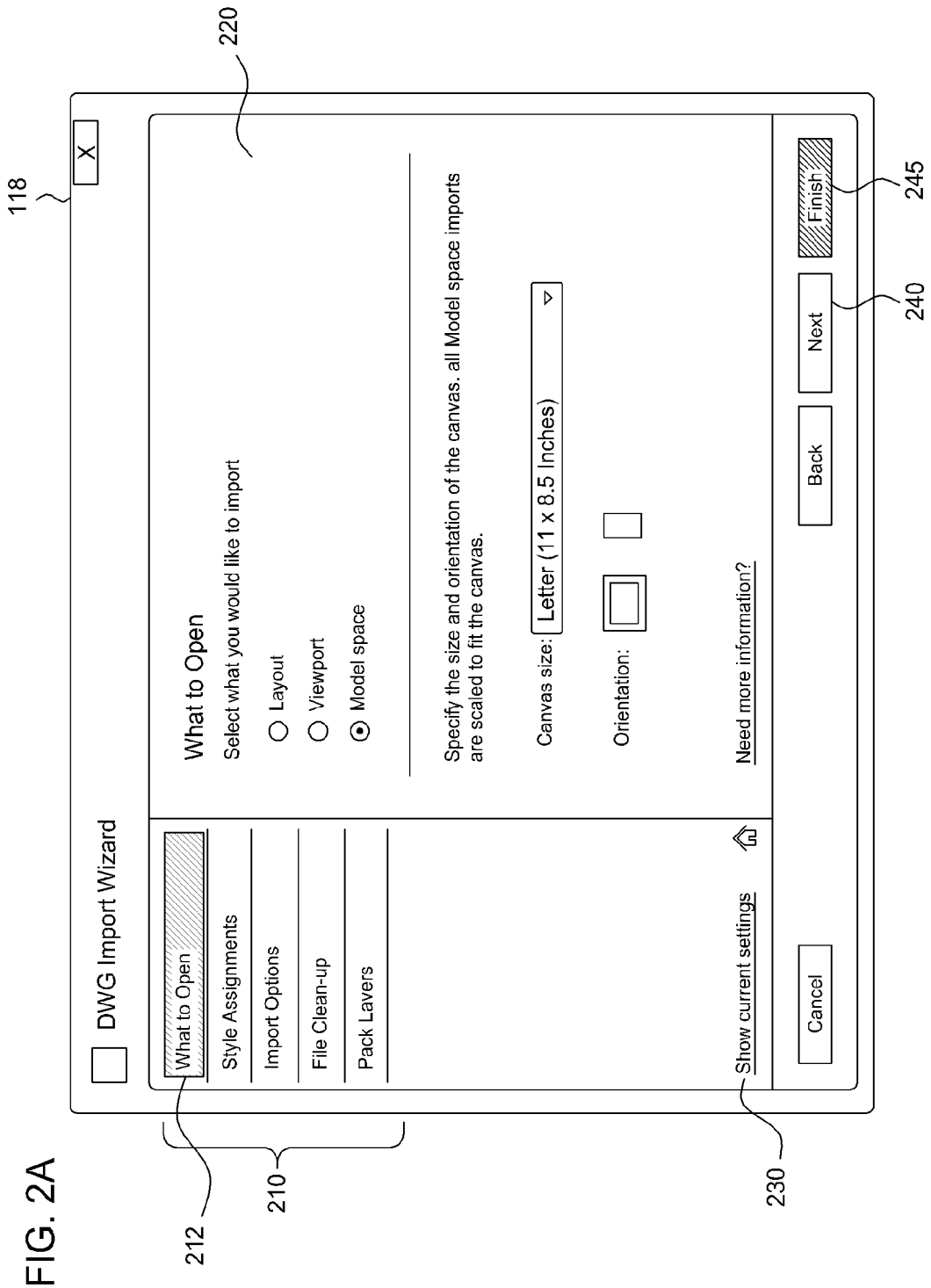
Figure 2C:
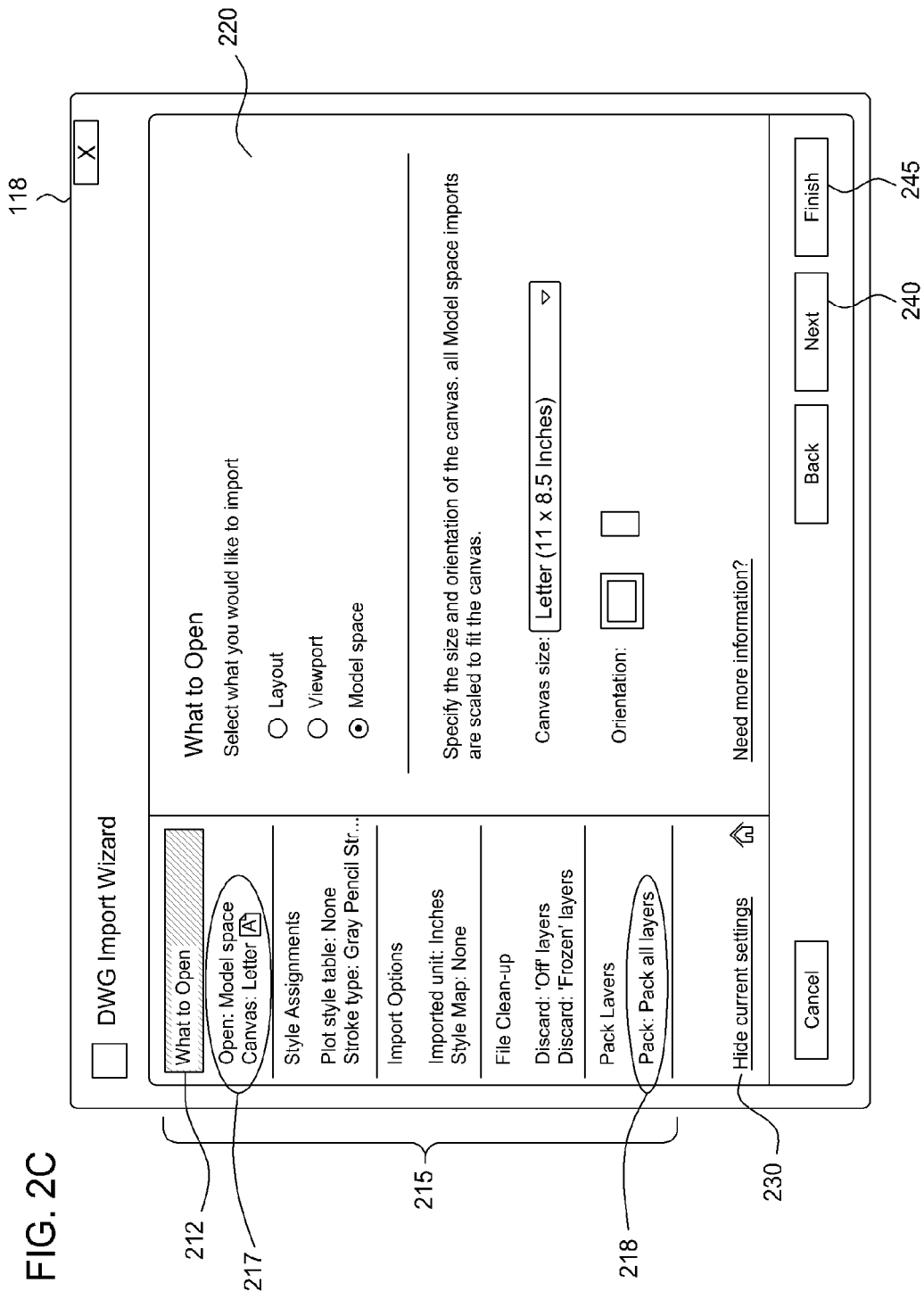

FIGS. 2A-2C illustrate a screen display of a wizard viewer 118. Illustratively, wizard viewer 118 displays an application wizard configured to guide a user through the process of importing a drawing file into a drawing application. As shown in FIG. 2A, wizard viewer 118 includes a navigation list 210, which lists the names of various dialog screens of this application wizard. Note that the first dialog screen name 212 of navigation list 210, labeled "What to Open," is highlighted, indicating this dialog is the currently active dialog screen. Accordingly, wizard viewer 118 displays a first dialog screen 220, titled "What to Open." The first dialog screen 220 is configured to guide the user through part of the wizard task of opening a drawing. Specifically, the first dialog screen 220 includes parameter settings that allow the user to specify what type of file the user desires to import. In this case, the user may select to import a "Layout," a "Viewport," and a "Model Space," and the "Model Space" option is currently selected. The first dialog screen 220 also allows the user to specify a canvas size and orientation for the drawing being imported. Additionally, the drawing import wizard includes a mode control link 230 labeled "Show Current Settings." In one embodiment, mode control link 230 allows the user to toggle between a standard mode (i.e., without a navigation list) or in an advanced mode (i.e., with a navigation list). As shown in FIG. 2A, the drawing import wizard is shown in a standard mode.

Assume that the user has completed the selections required to complete the first dialog screen 220. The user may then navigate to the next dialog screen titled, "Style assignments" by using a "Next" button 240. Also, a "Finish" button 245 is shown grayed out, indicating that this button is currently inactive. The "Finish" button 245 may remain in an inactive state until the user navigates through each step of this wizard. FIG. 2B illustrates the use of the drawing import wizard after the user has navigated to a last dialog screen 225. More specifically, the last dialog name 214 of navigation list 210 is highlighted, indicating that the user has navigated through the intervening "Style Assignments," "Import Options," and "File Clean-up" dialog screens (not shown). Accordingly, wizard viewer 118 displays the last dialog screen 225, titled "Optimize Performance: Pack Layers." Because the user has navigated through each step of this wizard, the "Finish" button 245 is shown in FIG. 2B in an active state. Upon completing the selection required in the last dialog screen 225, the user may complete the application wizard by selecting the "Finish" button 245.

In contrast to the strictly sequential process of navigating through the drawing import wizard described above, in one embodiment, navigation list 210 may be configured to enable a user to navigate directly to any given dialog screen, without having to interact with any intervening dialog screens. For example, assuming wizard viewer 118 shown in FIG. 2B is configured according to this embodiment, the user may select the last dialog name 214 (labeled "Pack Layers") of navigation list 210 to navigate to the last dialog screen 225, without interacting with each preceding dialog screen.

In another embodiment, wizard viewer 118 may be set to either a standard mode or an advanced mode, with the ability to navigate via the navigation list 210 only being available in the advanced mode. More specifically, beginning users, who may be unfamiliar with the details of a given application wizard, may not be provided with the ability to navigate to dialog screens out-of-order by selecting a dialog screen name in navigation list 210. Thus, beginning users may be guided through each dialog screen of the application wizard in sequence. On the other hand, an advanced mode may allow more experienced users to navigate directly to any given dialog screen, in any desired order, and to "complete" the wizard at any time using "Finish" button 245.

FIG. 2C illustrates the situation where a user has toggled the wizard viewer 118 to an advanced mode by selecting the mode control 230, according to one embodiment of the invention. As shown, each dialog screen name listed in navigation list 215 now includes a set of parameter names and corresponding values. These parameter names present the user with the parameters included in each given dialog screen. For example, the first dialog screen name 212 is now displayed with a set of parameter names 217, corresponding to the parameters included in the dialog screen 220. Specifically, the parameters include the settings for the "Model Space," "Canvas Size," and "Orientation" parameters of the first dialog screen 220. Similarly, for the "Style Assignments" dialog screen, the parameters include settings for a "Plot Style Table" of "None" and a "Stroke Type" of "Gray Pencil Stroke." Note, in the advanced mode, the settings for the "Style Assignments" dialog screen are presented to the user, even though this dialog screen is not currently active. Similarly, the parameter names and current settings for the "Import Options," "File Clean-up," and "Pack Layers" screens are also presented to the user, even though these dialog screens are not currently active.

In one embodiment, the parameter names 217 displayed in navigation list 215 may be limited to parameters that are applicable to a target application file 113. That is, in the case that application wizard 114 is directed to performing a task on a given application file 113, navigation list 215 may be configured to only show the names and values of the parameters that apply to the application file 113. For example, assume the wizard viewer 118 shown in FIG. 2C is used to import a graphics file that does not include layers into a drawing application. In this scenario, navigation list 215 may be modified so it does not display the parameter 218 (labeled "Pack: Pack all layers"), since that parameter would not apply to a graphics file without layers. Alternatively, parameters not relevant to a given application file 113 may be displayed with a gray appearance to indicate their inactive state.

In one embodiment, the navigation list 215 may be configured to allow the user to enter parameter values directly in navigation list 215. That is, navigation list 215 may be configured to enable a user to view and modify parameter values directly in the navigation list 215, without requiring the user to navigate to a dialog screen that includes the parameter. For example, assume the navigation list 215 shown in FIG. 2C is configured to enable direct entry of parameter values. In this example, the user may alter the value of parameter 218 from "Pack all layers" to "Don't pack layers" in navigation list 215, without requiring the user to navigate to dialog screen 225 (shown in FIG. 2B) to alter the parameter value. Thus, dangerously, the advanced mode with the wizard navigation list 215 allows the user to launch the wizard, and efficiently review each parameter value associated with each dialog panel of the wizard. Further, the user may jump to any desired panel to modify parameters as needed. Once completed, the user may then complete" the wizard at any time using "Finish" button 245.

Of course, wizard viewer 118 may be configured in forms other than the one illustrated in FIGS. 2A-2C. For example, navigation list 215 may include different graphical elements than those shown, such as a folder tree, a horizontal list, and the like. In another example, navigation list 215 may be arranged in a different portion of the wizard viewer 118 window, or may be presented in a separate window. These and other permutations are broadly contemplated, and may be used to suit the needs of a particular case.

Figure 3:
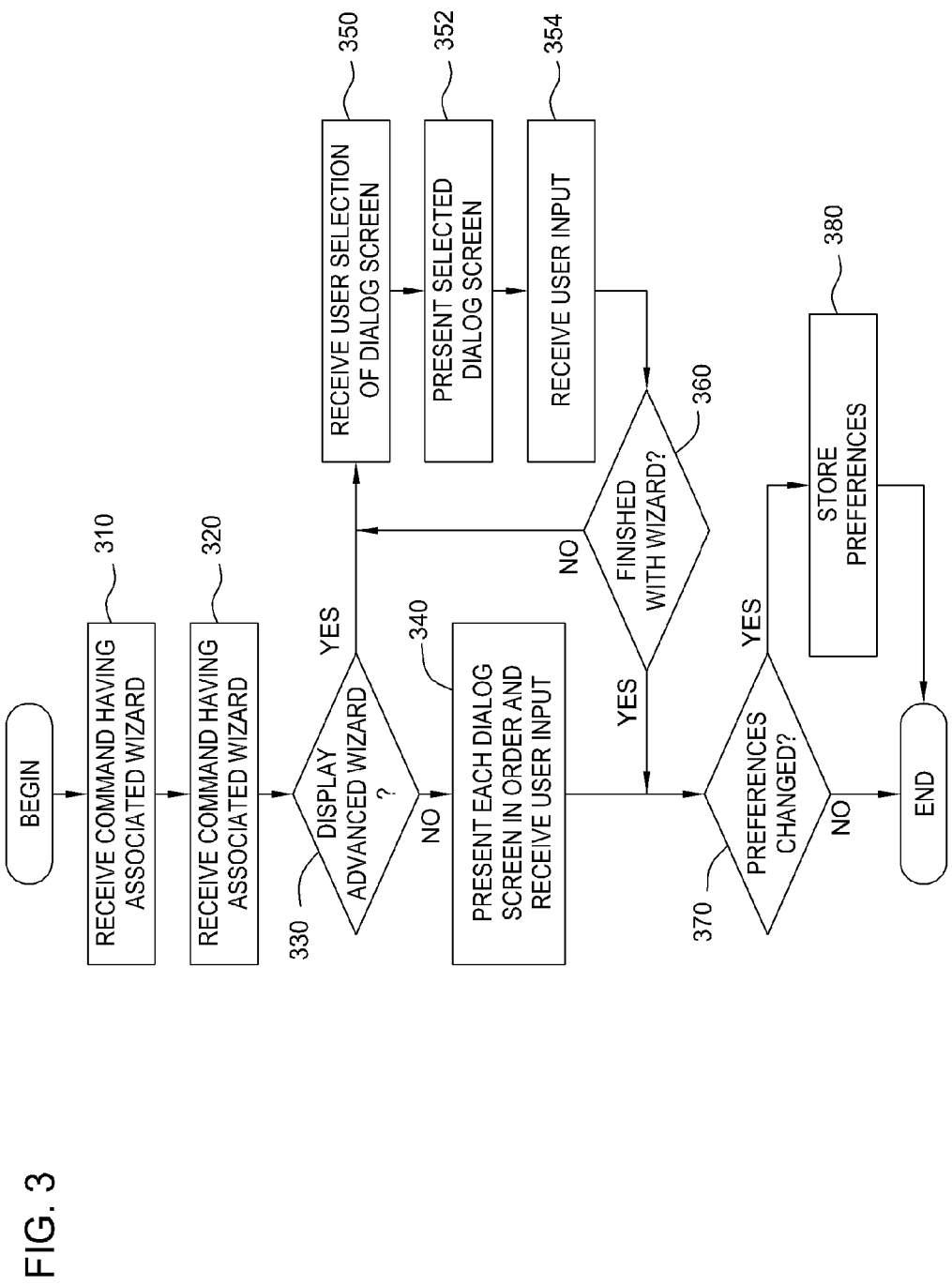
FIG. 3 illustrates a method 300 for presenting a user with a navigable software wizard, according to one embodiment of the invention.

FIG. 3 illustrates a method 300 for presenting a user with a navigable software wizard, according to one embodiment of the invention. Persons skilled in the art will understand that, even though the method is described in conjunction with the systems of FIGS. 1 and 2A-2C, any system configured to perform the steps of method 300, in any order, is within the scope of the present invention.

As shown, method 300 begins at step 310, where a user invokes an application wizard. For example, the user of application 114 may select a command to import a drawing file, and in response, the application 114 invokes the application wizard 117 associated with this particular task. Alternatively, the user may execute a command to invoke the wizard directly, e.g., by selecting from a list of available application wizards 114 organized by task. At step 320, a set of stored wizard preferences may be retrieved. For example, wizard preferences 115 may be retrieved from storage 112, as illustrated in FIG. 1. The stored wizard preferences may indicate the user's preferred settings for the parameters associated with the dialog screens, as well as a preferred mode of operation for the application wizard 117 to be presented to the user (e.g., in a standard mode (FIG. 2A) or an advance mode (FIG. 2C).

At step 330, the wizard viewer 118 may determine, based on the wizard preferences retrieved at step 320, whether to display the wizard in an advanced mode. Alternatively, the user may execute a command in the wizard viewer in order to select either a beginner or advanced mode. For example, the user may select the mode control link 230 included in wizard viewer 118 (as shown in FIG. 2A) in order to select a standard mode or an advanced mode. At step 340, if it is determined that the wizard is not to be displayed in advanced mode, then, the user is presented with each dialog screen of the wizard in sequence, beginning with the first dialog screen associated with the application wizard invoked at step 310. The user then interacts with each dialog screen to provide any required input, in sequence. Once the user has provided all require inputs in a dialog screen, the user may advance to the next dialog screen (e.g., using a "Next" button 240, as shown in FIG. 2A).

However, if it is determined at step 330 to display the application wizard 117 in an advanced mode, then at step 350, a user may select to navigate to any dialog screen of the application wizard. For example, the user may interact with the navigation list 215 shown in FIG. 2C, and select the dialog screen name "Pack Layers," indicating that the user desires to navigate to the corresponding dialog screen "Pack Layers." At step 352, the selected dialog screen may be presented to the user. For example, the dialog screen "Pack Layers" 225 may be presented in wizard viewer 118. Further, rather than having to navigate to a particular dialog screen to view the parameters associated with that screen, in the advanced mode, the navigation list may present both the name of each dialog screen in the application wizard, as well as the parameters for each respective dialog screen. At step 354, user input into the presented dialog screen may be received. For example, the user may interact with the parameter inputs included in dialog screen "Pack Layers" 225 to specify whether to pack all layers, to pack selected layers, or to not pack any layers (as shown in FIG. 2B).

At step 360 it is determined whether the user is finished interacting with the wizard. This may be determined, for example, by detecting that the user has selected the "Finish" button 245. If not, the method 300 returns back to step 350, and the user may continue to interact with different dialog screens of the wizard. However, if it is determined at step 360 that the user is finished with the wizard, then at step 370, it may be determined whether the user's preferences for the wizard have been changed. For example, the user may have selected the mode control link 230 to view a wizard in an advanced mode. If not, then the method 300 terminates. At step 380, however, if the preferences have been changed, the changed preferences may be stored. For example, the changed preferences may be stored in wizard preferences 115 (shown in FIG. 1). After step 380, the method 300 terminates.

Advantageously, embodiments of the invention may be used to present users with a navigable application wizard that includes a wizard navigation list. The navigation list may include links to dialog screens included in the wizard not currently being displayed by the wizard. The user may select the link to any particular dialog screen in order to navigate to that dialog screen, without having to pass through intervening dialog screens of the wizard. Further, the navigation list may display the names and settings of the parameters included in each dialog screen, allowing the user to quickly locate and evaluate a given parameter included in the wizard. Thus, the user may efficiently review each parameter value associated with each dialog screen of the wizard. Further still, the user may jump to any desired panel to modify parameters as needed and complete the wizard at any time to execute the task associated with the wizard.

While the forgoing is directed to embodiments of the present invention, other and further embodiments of the invention may be devised without departing from the basic scope thereof, and the scope thereof is determined by the claims that follow.

What is claimed is:

1. A method of presenting a user with an application wizard configured to assist the user in performing a particular task in a software application by guiding the user through a sequence of steps, the method comprising:

presenting to the user a navigation list that includes a plurality of links, wherein each link corresponds to a different step in the sequence of steps, wherein each different step is included in the application wizard, each link accesses a dialog screen associated with the different step corresponding to the link, and wherein the navigation list displays parameter value settings associated with the different steps included in the application wizard;

presenting to a user a first dialog screen corresponding to a first step included in the application wizard;

receiving an indication of a selected link included in the plurality of links;

replacing the presentation of the first dialog screen with a second dialog screen corresponding to the selected link, wherein the second dialog screen corresponds to a second step, and the first step and the second step are out-of-order in the sequence of steps; and performing the particular task based on the parameter value settings associated with each of the different steps included in the application wizard.

2. The method of claim 1, further comprising:
receiving a selection of a first parameter value presented by the second dialog screen.

3. The method of claim 1, further comprising, prior to presenting the navigation list associated with the application wizard, receiving a user command to invoke the navigation list.

4. The method of claim 1, further comprising:
receiving a selection of a first parameter value presented by the second dialog screen; and
storing the first parameter value for use in subsequent invocations of the application wizard.

5. The method of claim 1, wherein one or more parameters included in the presented dialog screen are limited to parameters that are applicable to an application file associated with the particular task performed by the application wizard.

6. The method of claim 1, further comprising, the step of receiving a selection of an application file to process using the particular task, and wherein one or more dialog screens are selected based on contents of the application file.

7. A computer-readable storage medium storing instructions for navigating an application wizard, including instructions for performing the steps of:

presenting to the user a navigation list that includes a plurality of links, wherein each link corresponds to a different step in the sequence of steps, wherein each different step is included in the application wizard, each link accesses a dialog screen associated with the different step corresponding to the link, and wherein the navigation list displays parameter value settings associated with the different steps included in the application wizard;

presenting to a user a first dialog screen corresponding to a first step included in the application wizard;

receiving an indication of a selected link included in the plurality of links;

replacing the presentation of the first dialog screen with a second dialog screen corresponding to the selected link, wherein the second dialog screen corresponds to a second step, and the first step and the second step are out-of-order in the sequence of steps; and performing the particular task based on the parameter value settings associated with each of the different steps included in the application wizard.

8. The computer-readable storage medium of claim 7, wherein the steps further comprise:
receiving a selection of a first parameter value presented by the second dialog screen.

9. The computer-readable storage medium of claim 7, wherein the steps further comprise, prior to presenting the navigation list associated with the application wizard, receiving a user command to invoke the navigation list.

10. The computer-readable storage medium of claim 7, wherein the steps further comprise:

receiving a selection of a first parameter value presented by the second dialog screen; and storing the first parameter value for use in subsequent invocations of the application wizard.

11. The computer-readable storage medium of claim 7, wherein one or more parameters included in the presented dialog screen are limited to parameters that are applicable to an application file associated with the task performed by the application wizard.

12. The computer-readable storage medium of claim 7, further comprising, the step of receiving a selection of an application file to process using the particular task, and wherein one or more dialog screens are selected based on contents of the application file.

13. A method performing a particular task using a software application, the method comprising:
  invoking an application wizard configured to assist a user in performing the particular task by guiding the user through a sequence of steps, wherein the application wizard is configured to:
    present to the user a navigation list that includes a plurality of links, wherein each link corresponds to a different step in the sequence of steps, wherein each different step is included in the application wizard, each link accesses a dialog screen associated with the different step corresponding to the link, and wherein the navigation list displays parameter value settings associated with the different steps included in the application wizard;
    present to a user a first dialog screen corresponding to a first step included in the application wizard;
    receive an indication of a selected link included in the plurality of links;
    replacing the presentation of the first dialog screen with a second dialog screen corresponding to the selected link, wherein the second dialog screen corresponds to a second step, and the first step and the second step are out-of-order in the sequence of steps; and
    perform the particular task based on the parameter value settings associated with each of the different steps included in the application wizard.

14. The method of claim 13, wherein the application wizard is further configured to:
  receive a selection of a first parameter value presented by the second dialog screen.

15. The method of claim 13, wherein the application wizard is further configured to:
  receive a selection of a first parameter value presented by the second dialog screen; and
  store the first parameter value for use in subsequent invocations of the application wizard.

16. The method of claim 13, wherein one or more parameters included in the presented dialog screen are limited to parameters that are applicable to an application file associated with the particular task performed by the application wizard.

17. The method of claim 13, wherein the application wizard is further configured to receive a selection of an application file to process using the particular task, and wherein one or more dialog screens are selected based on contents of the application file.

18. A method for performing a task having a sequence of steps, comprising:
  presenting an application wizard that displays a plurality of links, wherein for a specific link selected from the plurality of links, the specific link is associated with a corresponding step selected from the sequence of steps, the corresponding step includes a corresponding parameter value setting for the task, and the specific link is associated with a corresponding dialog screen for inputting the corresponding parameter value setting;
  in response to a first selection of a first link from the plurality of links, displaying a first dialog screen associated with the first link, wherein the first dialog screen is configured to receive a first parameter value setting for a first step that is associated with the first link;
  in response to a second selection of a second link from the plurality of links, displaying a second dialog screen associated with the second link, wherein the second dialog screen is configured to receive a second parameter value setting for a second step that is associated with the second link, and the first step and the second step are out-of-order in the sequence of steps; and
  upon receiving the first parameter value setting and the second parameter value setting, performing the task based on the first parameter value setting and the second parameter value setting.

* * * * *